(12) United States Patent
Haex

(10) Patent No.: US 11,524,347 B2
(45) Date of Patent: Dec. 13, 2022

(54) CUTTING ASSEMBLY WITH MULTIPLE CUTTING TOOLS FOR MILLING

(71) Applicant: SECO TOOLS AB, Fagersta (SE)

(72) Inventor: Henk Haex, Weert (NL)

(73) Assignee: SECO TOOLS AB, Fagersta (SE)

( * ) Notice: Subject to any disclaimer, the term of this patent is extended or adjusted under 35 U.S.C. 154(b) by 135 days.

(21) Appl. No.: 16/464,602

(22) PCT Filed: Nov. 21, 2017

(86) PCT No.: PCT/EP2017/079980
§ 371 (c)(1),
(2) Date: May 28, 2019

(87) PCT Pub. No.: WO2018/099769
PCT Pub. Date: Jun. 7, 2018

(65) Prior Publication Data
US 2021/0094107 A1 Apr. 1, 2021

(30) Foreign Application Priority Data
Nov. 30, 2016 (EP) .................................... 16201520

(51) Int. Cl.
*B23C 5/02* (2006.01)
*B23C 5/10* (2006.01)
*B23C 5/00* (2006.01)

(52) U.S. Cl.
CPC ................ *B23C 5/10* (2013.01); *B23C 5/006* (2013.01); *B23C 2210/02* (2013.01); *B23C 2210/03* (2013.01)

(58) Field of Classification Search
CPC .. B23B 3/16; B23B 3/162; B23B 7/04; B23B 29/24; B23B 29/248; B23B 29/26; B23B 29/28; B23B 29/32; B23B 29/323; B23Q 2220/002; B23Q 3/10; B23Q 3/161; B23Q 3/18; B23Q 39/04; B23C 5/06; B23C 5/20; B23C 5/10; B23C 5/16; B23C 5/22; B23C 5/24; B23C 5/242
See application file for complete search history.

(56) References Cited

U.S. PATENT DOCUMENTS

| | | | | |
|---|---|---|---|---|
| 1,945,854 A | * | 2/1934 | Hall ........................... | B23C 5/22 407/39 |
| 2,586,955 A | * | 2/1952 | Kaiser .................... | B23C 5/2472 407/42 |
| 3,355,797 A | * | 12/1967 | Lohneis .................. | B23Q 3/157 483/66 |
| 3,512,236 A | * | 5/1970 | Renaud .................. | B23C 5/2462 407/38 |

(Continued)

FOREIGN PATENT DOCUMENTS

| CN | 102653015 A | 9/2012 |
|---|---|---|
| CN | 103084633 B | 9/2015 |

(Continued)

*Primary Examiner* — Nicole N Ramos
(74) *Attorney, Agent, or Firm* — Corinne R. Gorski

(57) ABSTRACT

A cutting assembly for milling includes at least two milling cutting tools with shanks that are arranged in a rotatable tool holder at a distance from the central axis of the tool holder, such that an operational region of a cutting portion of each cutting tool is primarily facing outwards, in a radial direction, from the tool holder central axis.

10 Claims, 2 Drawing Sheets

(56) References Cited

U.S. PATENT DOCUMENTS

| | | | | |
|---|---|---|---|---|
| 3,715,801 A | * | 2/1973 | Sato | B23Q 3/15713 483/4 |
| 3,994,615 A | * | 11/1976 | Narang | B23B 31/005 408/226 |
| 4,893,967 A | * | 1/1990 | Briese | B23C 5/22 407/101 |
| 4,930,948 A | * | 6/1990 | Bowen | B23C 3/051 408/181 |
| 4,971,491 A | * | 11/1990 | Cook | B23B 31/006 408/1 BD |
| 5,607,263 A | * | 3/1997 | Nespeta | B23B 31/11 407/61 |
| 6,716,146 B2 | * | 4/2004 | Kato | B23Q 16/10 483/58 |
| 7,395,589 B1 | * | 7/2008 | Kuo | B23B 29/242 29/33 J |
| 7,913,595 B2 | * | 3/2011 | Neumeier | B23Q 3/12 82/96 |
| D668,697 S | * | 10/2012 | Hsu | D15/139 |
| 9,254,525 B2 | * | 2/2016 | Mizoguchi | B23B 31/008 |
| 9,302,334 B2 | * | 4/2016 | Tan | B23C 5/12 |
| 9,770,770 B2 | * | 9/2017 | Mada | B23C 5/241 |
| 9,873,176 B2 | * | 1/2018 | Neth | B23Q 39/044 |
| 9,919,366 B2 | * | 3/2018 | Orlov | B23C 5/109 |
| 2005/0091812 A1 | * | 5/2005 | Hiramoto | B23Q 1/626 29/35.5 |
| 2007/0209179 A1 | * | 9/2007 | Williams | B23F 9/082 29/27 C |
| 2009/0060662 A1 | * | 3/2009 | Maurer | B23C 5/06 407/42 |
| 2013/0243541 A1 | * | 9/2013 | Stagge | B23B 31/005 279/96 |
| 2014/0210169 A1 | | 7/2014 | Mizoguchi | |
| 2018/0354085 A1 | * | 12/2018 | Li | B23Q 3/15713 |

FOREIGN PATENT DOCUMENTS

| | | |
|---|---|---|
| CN | 104959661 A | 10/2015 |
| CN | 103357937 B | 6/2016 |
| DE | 102010055429 A1 | 7/2011 |
| EP | 2818268 A1 | 12/2014 |
| WO | 2004018134 A1 | 3/2004 |
| WO | 2014056888 A1 | 4/2014 |

* cited by examiner

CUTTING ASSEMBLY WITH MULTIPLE CUTTING TOOLS FOR MILLING

RELATED APPLICATION DATA

This application is a § 371 National Stage Application of PCT International Application No. PCT/EP2017/079980 filed Nov. 21, 2017 claiming priority to EP 16201520.0 filed Nov. 30, 2016.

TECHNICAL FIELD

The invention relates to a cutting assembly for milling as well as a tool holder, a cutting tool shank and a cutting tool for use in such assembly.

BACKGROUND ART

In the art of milling it is known to use milling tools having a plurality of indexable inserts arranged at the periphery of a milling tool body. An insert used in this kind of tool often has a through hole used for mounting the insert to the milling tool body, for example using a screw.

Document EP2818268 shows such a tool where a number of cutting inserts are mounted around the periphery of a holder and used as indexable inserts therein. The tool described in EP2818268 is adapted for slot milling and would not be suitable for other kinds of milling operations, in particular not for milling operations with high speeds and feeds and a large depth of cut.

In many milling operations, such as demanding operations using high feeds and speeds and a large depth of cut, the cutting tools according to the prior art do not provide satisfactory results.

SUMMARY

It is an object of the present invention to mitigate the shortcomings of the prior art and to provide means for efficient, high-quality machining, and in particular to provide a cutting assembly suitable for milling operations with high speeds and large depth of cut.

Thus, according to a first aspect, the invention relates to a cutting assembly comprising a tool holder including a tool holder body having a rear coupling end, a front end, a tool holder central axis around which the tool holder is rotatable, and at least a first and a second tool mounting recess, wherein the tool holder central axis extends through the tool holder body between the front end and the rear coupling end, and wherein each tool mounting recess includes an opening being at least partly located in a surface of the front end and spaced apart from the tool holder central axis. Furthermore, the assembly comprises at least a first and a second cutting tool for milling, each cutting tool including a cutting tool body having a shank at a rear end, a cutting portion at a front end, which cutting portion comprising one or more peripheral cutting edges, and a cutting tool axis extending through the shank and the cutting portion, wherein the shank of the first cutting tool is arranged in the first tool mounting recess and the shank of the second cutting tool is arranged in the second tool mounting recess, such that at least a part of the cutting portion of each cutting tool extends from the tool holder, wherein an operational region of the cutting portion of each cutting tool is primarily facing outwards, in a radial direction, from the tool holder central axis.

Hence, a robust, rigid cutting tool assembly is obtained that can be used in demanding milling operations with no or little vibration or chatter, resulting in high-quality machined surfaces. Furthermore, the assembly provides for good chip evacuation. The cutting tools used in the assembly can easily be grinded to the preferred geometry, and they can also be used in other tool holders, such as, for example, conventional tool holders with a single centrally arranged tool mounting recess. This gives the user much flexibility since he or she can use available cutting tools differently depending on the situation.

The cutting portion of each cutting tool comprises one or more peripheral cutting edges, i.e. cutting edges extending along the periphery of the cutting tool (often primarily in the axial direction). In addition, the cutting portion might comprise end cutting edges extending in a radial direction at the front end of the cutting portion.

The operational region of the cutting portion of each cutting tool may comprise a single peripheral cutting edge, or, if the helix angle is large, different parts of multiple peripheral cutting edges. An operational region of the cutting portion should be understood as the part(s) of the cutting edge(s) that will engage the work piece during machining. An operational region of a cutting tool normally corresponds to one of several indexable mounting positions of the tool.

The openings of the tool mounting recesses may be located entirely in the surface of the front end of the tool holder. However, it is also conceivable that the openings are partly located in a peripheral surface of the tool holder body. At least a part of the cutting portion of each cutting tool may be located forward of the surface of the front end in the axial direction of the tool holder. Preferably, the cutting portion extends forward from the surface of the front end in the axial direction of the tool holder. However, it is also possible that the cutting portion of each cutting tool extends from the tool holder only in the radial direction (possible if the tool mounting recess openings are partly located in the peripheral surface of the tool holder body), or extends from the tool holder in both a radial and an axial direction. Hence, the operational region of the cutting portion of each cutting tool could be entirely or partly located either radially outside or radially inside the peripheral surface of the tool holder body with respect to the tool holder central axis.

The at least first and second cutting tool for milling is oblong, elongated in the cutting tool axis direction, and may be a solid round tool, for example a solid end mill.

The shank of each cutting tool is oblong, elongated in the cutting tool axis direction, and may be solid, i.e. not hollow or containing any internal cavities or through holes. The shank of each cutting tool may comprise an abutting end surface and each tool mounting recess may include a bottom support surface located between the front end and the rear coupling end, wherein the abutting end surface of the first cutting tool abuts the bottom support surface of the first tool mounting recess, and the abutting end surface of the second cutting tool abuts the bottom support surface of the second tool mounting recess, such that the cutting tools are arranged at a predetermined axial position in relation to the tool holder body.

By having a bottom support surface in each tool mounting recess for supporting an abutment surface of the cutting tool, each cutting tool is steadily positioned at a predefined axial location, e.g. with a predefined axial extension from the surface of the front end of the tool holder.

Each tool mounting recess may have an elongated shape and extend at least partly into the tool holder body in a direction substantially parallel to the tool holder central axis, such that the cutting tool axis of each cutting tool is substantially parallel with the tool holder central axis. Each cutting tool may extend an axial distance A from the surface of the front end in the axial direction of the tool holder, wherein this distance A is related to a diameter D of the cutting tool as A≤1.5 D. This relationship between diameter and axial extension of the cutting tool is beneficial for obtaining a robust cutting assembly with low tendency for vibration and chatter.

In other embodiments it may be sufficient if the distance A is less than 1.5 the diameter of the tool holder body at the front end surface.

All cutting tools may have substantially equal extension from the surface of the front end in the axial direction of the tool holder.

The cutting assembly may comprise an even number of cutting tools being pairwise arranged such that the cutting tools of a pair are symmetrically arranged in the tool holder on opposite sides of, and equally spaced from, the tool holder central axis.

All cutting tools of the cutting assembly may be spaced equally far from the tool holder central axis in a radial direction. Alternatively, the cutting tools of a first pair may be spaced from the tool holder central axis by a first radial distance, and the cutting tools of a second pair may be spaced from the tool holder central axis by a second radial distance, wherein the second radial distance is different from the first radial distance. In such configuration, the cutting tools of the first pair may extend from the surface of the front end in the axial direction of the tool holder by a first axial distance, and the cutting tools of the second pair may extend from the surface of the front end in the axial direction of the tool holder by a second axial distance, wherein the second axial distance is different from the first axial distance.

By this, complex geometries can be machined in a single operation, for example a pocket of which the central part along the extension of the pocket has a greater depth, machined by cutting tools being located closer to the tool holder central axis but extending further from the tool holder in the axial direction. Such a configuration is also advantageous with respect to balancing of the cutting assembly.

Each of the first and second tool mounting recesses may comprise tool alignment means, and each shank of the first and second cutting tools may comprise one interlocking feature for each peripheral cutting edge for interlocking with the tool alignment means, such that each of the first and second cutting tools is non-rotatably arranged in their respective tool mounting recesses with the corresponding peripheral cutting edge in a predefined position with respect to the tool holder body.

By this, each cutting tool can be easily positioned in a correct position for machining, i.e. in a position where a specific peripheral cutting edge is correctly located to form, or be a part of, an operational region of the cutting portion. For example, such position could be a position in which the most forwardly located point of a peripheral cutting edge (i.e. the point where the peripheral cutting edge transforms into an end cutting edge), is located at a greater radial distance from the tool holder central axis than any other part of the cutting portion located at the same axial position of the cutting tool. If the cutting portion comprises more than one peripheral cutting edge, the cutting tool could be re-arranged within the tool mounting recess such that another region of the cutting portion, involving another part of the peripheral cutting edge and/or another peripheral cutting edge, would be positioned as an operational region primarily facing outwards in a radial direction from the tool holder central axis. Such "indexing" of cutting edges is principally similar to how a cutting insert with multiple cutting edges is re-arranged in conventional indexable milling tools.

The interlocking feature may comprise a substantially flat region in the shank.

The tool alignment means may comprise a threaded hole extending from the tool mounting recess to a peripheral surface of the tool holder body and a screw extending through the threaded hole and engaging the interlocking feature of the shank.

By this, the cutting tool is not only non-rotatably aligned within the tool mounting recess, but also clamped in a fixed position with respect to the axial direction of the tool holder.

The threaded hole preferably extends from the tool mounting recess to the peripheral surface of the tool holder along a direction which is non-parallel to an imaginary straight radial line between the tool holder central axis and the center of the tool mounting recess. By this, the length of the threaded hole can be increased compared to a radial threaded hole extending along the imaginary line. This is particularly advantageous when the tool mounting recesses are close to the periphery of the tool holder body, i.e. when the wall portion between the tool mounting recess and the peripheral surface of the tool holder is thin in the radial direction. To securely clamp the cutting tool within the tool mounting recess, the threaded hole should be as long as possible to give enough space for the threads. Hence, if letting the hole extend non-parallel to the radial direction, the length of the threaded hole can be increased. Preferably, the non-parallel direction is substantially perpendicular to the imaginary line. Furthermore, by using such configuration the clamping force will, to a higher degree, be retained also at greater cutting speeds.

As an alternative to using a screw engaging an interlocking feature for both aligning the tool and at the same time clamping the tool, the tool alignment means and the interlocking feature may comprise geometrically complementary regions interlocking with each other. Accordingly, the correct positioning could be obtained by tool alignment means consisting of a geometrical divergence of the tool mounting recess that matches a similar, complementary, geometrical divergence in the shank of the cutting tool, such that the shank can only be inserted into the tool mounting recess in one of a number of possible orientations. Hence, if the interlocking feature comprises a flat surface on an otherwise cylindrical shank, the tool alignment means would comprise a corresponding flat surface in an otherwise cylindrical tool mounting recess. If the shank of the cutting tool comprises more than one such regions being geometrically complementary with the alignment means, the cutting tool can be positioned within the tool mounting recess in a corresponding number of positions. The geometrically complementary regions could be based on other forms, such as, for example, surfaces being curved or arched in a way being divergent from the overall geometry of the shank and the tool mounting recess. For clamping the cutting tool within the tool mounting recess, to mitigate axial movements of the tool within the tool mounting recess, a screw engaging the shank through a threaded hole could be used.

According to another aspect, the invention relates to a tool holder for use in a cutting assembly, wherein the tool holder includes a tool holder body having a rear coupling end, a front end, a tool holder central axis around which the tool holder is rotatable, and at least a first and a second tool mounting recess, in each of which a shank of a cutting tool for milling is arrangeable, wherein the tool holder central axis extends through the tool holder body between the front end and the rear coupling end, and wherein each tool mounting recess includes an opening being at least partly located in a surface of the front end and spaced apart from the tool holder central axis, and wherein each tool mounting recess is delimited by the tool holder body in all directions perpendicular to the tool holder central axis along a major part of the longitudinal extension thereof.

Each tool mounting recess preferably comprises tool alignment means including a threaded hole extending from the tool mounting recess to a peripheral surface of the tool holder body.

Preferably, the threaded hole extends from the tool mounting recess to the peripheral surface of the tool holder body along a direction which is non-parallel to an imaginary straight radial line between the tool holder central axis and the center of the tool mounting recess.

The tool holder may also have a central tool mounting recess in which the shank of a cutting tool for milling is arrangeable, wherein the central tool mounting recess extends at least partly through the tool holder body from an opening in the surface of the front end towards the rear coupling end along the tool holder central axis.

The presence of a central tool mounting hole increases flexibility, since the same tool holder could be used also for conventional machining with only a centrally arranged cutting tool.

The tool holder may comprise one or more coolant channels extending through the tool holder body for supplying coolant or other cutting fluid.

The tool holder may be adapted for a modular cutting assembly wherein the rear coupling end is mountable to a basic holder which is arrangeable to a machine tool spindle. Hence, the cutting assembly could be adapted for some kind of modular quick-change system, such as, for example, Coromant Capto®.

According to another aspect, the invention relates to a cutting tool shank for use in a cutting assembly. The cutting tool shank is characterized by having an overall cylindrical shape and comprising at least two interlocking features, wherein each interlocking feature includes a region being geometrically divergent from the overall cylindrical shape.

For use with a cutting tool having more than one peripheral cutting edges (and consequently more than one regions of the cutting portion that can act as operational regions in a cutting assembly according to the invention), such configuration of the cutting tool shank allows "indexing" of the cutting edges to be made in a precise manner. The geometrically divergent regions may be substantially flat. For example, the regions may simply be flat areas machined into the surface of the shank. The regions may be recessed in the shank, e.g. formed as depressions in the shank. Each region would obviously have a limited extension along the circumference of the shank, but could extend either along the whole, or only along a part, of the axial extension of the shank. The regions do not have to include flat areas but could have other shapes. For example, the regions could be formed as circular, concave, e.g. half-sphere shaped, depressions in the shank. Preferably, the at least two interlocking features are located around the circumference of the shank at substantially the same axial location of the shank, i.e. each interlocking feature is, in a longitudinal direction, spaced from an end surface of the overall cylindrically shaped shank by the same distance.

The cutting tool shank is oblong, elongated in the direction of the axial extension of the shank, and may be solid, i.e. not hollow or containing any internal cavities or through holes.

According to another aspect, the invention relates to a cutting tool for milling comprising a cutting tool shank, a cutting portion comprising two or more peripheral cutting edges, and a cutting tool axis extending through the cutting tool shank and the cutting portion, wherein each of the at least two interlocking features are associated with each of the at least two peripheral edges, respectively.

The cutting tool is oblong, elongated in the cutting tool axis direction.

The cutting portion may be integrally formed to the cutting tool shank, e.g. in which the shank and the cutting portion are formed out of a single solid tool blank.

Thus, the cutting tool could be a solid end mill, for example made of cemented carbide.

Alternatively, the cutting portion could be detachably arranged to the cutting tool shank, i.e. the cutting tool could be of the "exchangeable head" type. For such a cutting tool, the detachable cutting portion (i.e. the exchangeable head) could be made of cemented carbide, while the shank could be made of another material, such as steel. The detachable cutting portion could be connected to the shank by a threaded connection in which the cutting tool shank comprises a first threaded part and the cutting portion comprises a second threaded part for mating with the first threaded part. However, also interfaces including geometrically and/or frictionally interlocking features are possible.

DETAILED DESCRIPTION OF EMBODIMENTS

Figure 1:
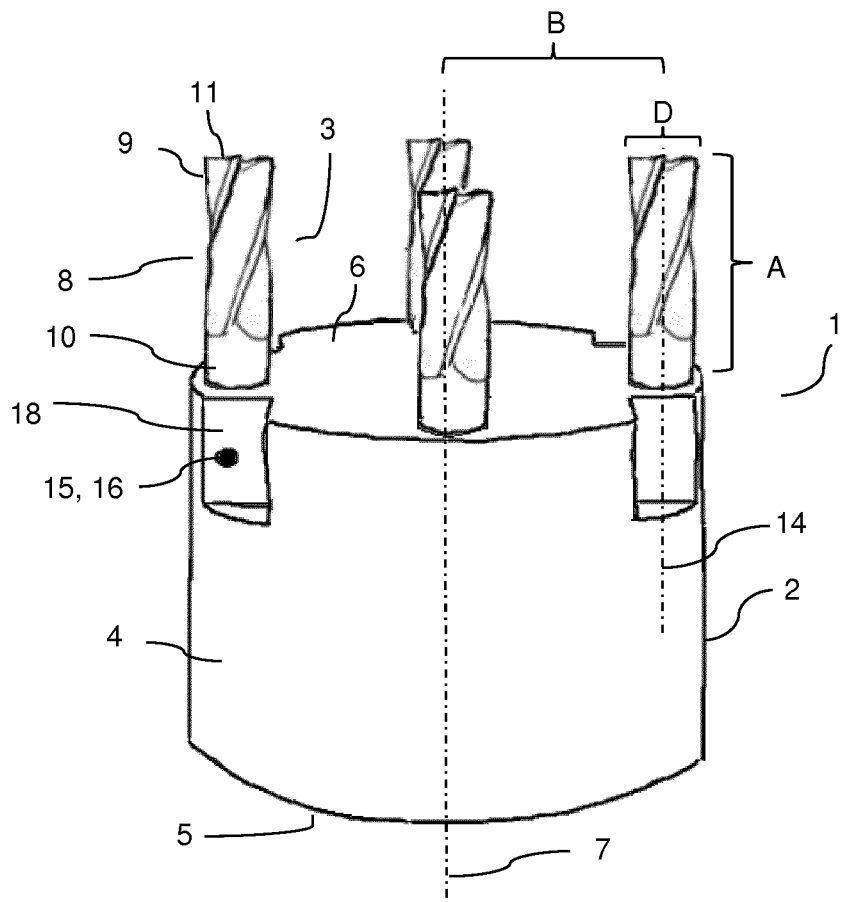
FIG. 1 shows an example of a cutting assembly

A cutting assembly, a tool holder and a cutting tool according to the invention will now be described with reference to FIGS. 1-6. The cutting assembly, illustrated in FIGS. 1-3, comprises a tool holder 2 and four milling cutting tools 3 arranged in the tool holder. The tool holder has a tool holder body 4, a rear coupling end 5, and a front end 6. A tool holder central axis 7, around which the tool holder is rotatable when mounted to a machine tool spindle, extends through the tool holder body 4 between the front end 6 and the rear coupling end 5. The rear coupling end 5 is arrangeable to a machine tool spindle (not shown), either directly or via a basic holder of a modular tooling system, such as Coromant Capto®. Each cutting tool comprises a cutting portion 8 with four peripheral cutting edges 9 (of which the most radially distal peripheral cutting edge of one cutting tool is indicated in the figures) and a shank 10 (of which the major part is located within the tool holder body and therefore not visible in FIG. 1). Each peripheral cutting edge 9 transforms into an end cutting edge 11. The shank of each cutting tool is arranged in a tool mounting recess 12 (best seen in FIG. 3) in the form of a cylindrical blind hole having an opening 13 (best seen in FIG. 4) in the surface of the front end of the tool holder. Each cutting tool 3 has a cutting tool axis 14 extending through the cutting portion and the shank.

Each cutting tool 3 extends a distance A from the surface of the front end 6 in the axial direction of the tool holder, and is non-rotatably arranged in a tool mounting recess 12 at a radial distance B from the tool holder central axis. The distance A is preferably not greater than 1.5 times the diameter D of the cutting tool. Such relationship between the distance A and diameter D provides for a robust cutting assembly.

In other embodiments it may be sufficient if the distance A is less than 1.5 the diameter of the tool holder body at the front end surface.

By arranging the cutting tools at a distance from the tool holder central axis 7, mainly the peripheral parts of the cutting portion 8 facing outwards from the tool holder central axis (and in particular the most radially distal peripheral cutting edge 9) will be in operational contact with a workpiece when the tool holder is rotated around the tool holder central axis 7 during machining.

In order to align and clamp the cutting tool in the correct position in which the most radially distal peripheral cutting edge 9 engages a workpiece during machining, the tool holder comprises alignment means in the form of a screw 15 and a threaded hole 16 extending from the tool mounting recess 12 to a peripheral surface of the tool holder body 4. The threaded hole extends perpendicularly to an imaginary radial line 19 (see FIG. 2) extending from the tool holder central axis 7 through a central axis 20 (which coincides with the cutting tool axis 14 of the corresponding cutting tool 3) of the respective tool mounting recess 12. As seen in FIG. 1, in this particular embodiment the tool holder body includes deep recesses 18 in the otherwise cylindrically shaped tool holder, and each threaded hole 16 opens in the peripheral surface of this recessed part of the tool holder body.

Figure 2:
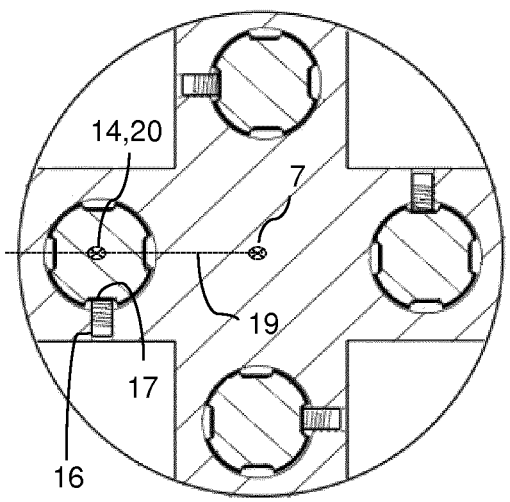
FIG. 2 shows the cutting assembly of FIG. 1 in a cross sectional view in a plane perpendicular to the tool holder central axis.

As best seen in FIG. 2, which is a cross-sectional view in a plane perpendicular to the tool holder central axis 7 at a position where the tool alignment means are located, the screw engages an interlocking feature in the form of a flat surface 17 in the shank, and clamps the cutting tool in this particular position. The shank has four such flat surfaces distributed around the periphery of the shank. By matching the location of the tool alignment means 15, 16 with the circumferential locations of the flat surfaces 17 on the shank (wherein the flat surfaces have a known positional relationship with the peripheral cutting edges 9), each peripheral cutting edge 9 is located in a predefined position with respect to the tool holder when the cutting tool is clamped within the holder by screw 15 engaging the flat 17. More specifically, the most radially distal peripheral cutting edge 9 is positioned such that the point where the peripheral cutting edge 9 transforms into an end cutting edge 11, which is axially located at a distance B from the surface of the front end of the tool holder, is located at a greater radial distance from the tool holder central axis than any other part of the cutting portion being located at the same distance B from the surface of the front end of the tool holder. In this embodiment, the tool alignment means 15, 16 also provides clamping of the cutting tool. In other embodiments, the alignment means merely provides correct positioning of the cutting tool with respect to the tool holder, whereas clamping of the tool within the tool mounting recess is obtained by separate means.

The number of flat regions 17 corresponds to the number of peripheral cutting edges 9 of the cutting tool. Thereby, a new peripheral cutting edge can be easily indexed by releasing the screw 15, rotating the cutting tool 3 (in this case 90°) and tightening the screw again, such that another flat 17 is engaged by the screw 15.

Figure 3:
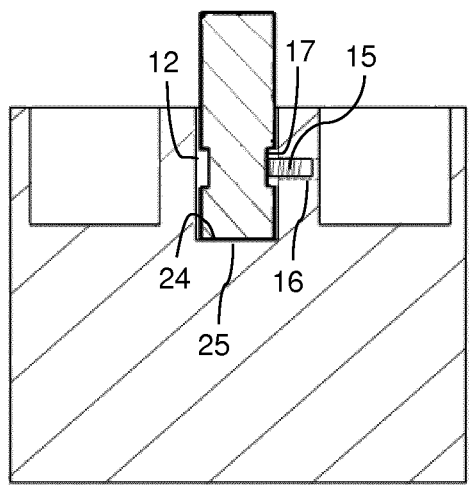
FIG. 3 shows the cutting assembly of FIG. 1 in a cross sectional view in a plane parallel to the tool holder central axis.

FIG. 3 is a cross-sectional view in a plane parallel to the tool holder central axis, showing the alignment and clamping of the cutting tool 3 within a tool mounting recess 12. The shank of the cutting tool has an abutment surface 24 at its rear end, and the tool mounting recess has a bottom support surface 25. When the cutting tool is mounted within the tool mounting recess, the abutment surface 24 abuts the bottom support surface 25.

Figure 4:
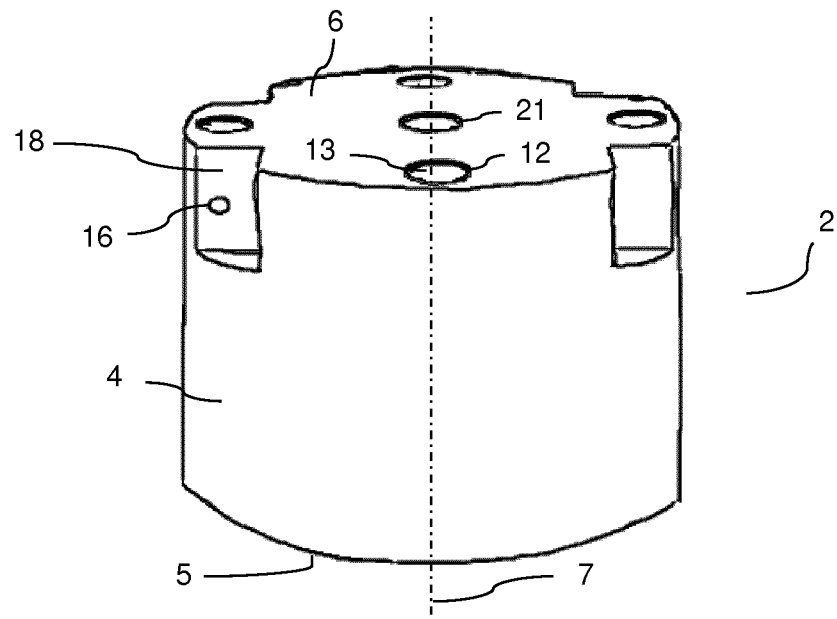
FIG. 4 shows a tool holder for a cutting assembly.

FIG. 4 shows a tool holder for use in a cutting assembly. The same reference numbers as used in FIGS. 1-3 are used for corresponding features in FIG. 4. Each tool mounting recess 12 is formed as a cylindrical blind hole with openings 13 in the surface of the front end. Except for being intersected by a threaded hole 16, each tool mounting recess is delimited by the tool holder body in all directions perpendicular to the tool holder central axis along the longitudinal extension of the blind hole. The tool holder shown in FIG. 4 does not only have peripheral tool mounting recesses, but also a centrally arranged tool mounting recess 21. If a cutting tool is arranged in this recess instead of in the peripherally arranged tool mounting recesses, the tool could be used for conventional machining where the cutting tool axis coincides with the central (rotation) axis of the tool holder. A cutting tool would normally not be mounted in the central tool mounting recess when the tool holder is used in a cutting assembly as described with reference to FIGS. 1-3. However, the presence of the central tool mounting hole increase flexibility, since the same tool holder could be used in a cutting assembly as shown in FIG. 1, or for conventional machining with only a centrally arranged cutting tool. The exact tangential location of the cutting edges would not be important when mounting the cutting tool in the centrally arranged tool mounting recess 21. The interlocking features would therefore not fill any purpose in such assembly. Nevertheless, a cutting tool according to the invention would still be arrangeable in the central tool mounting recess.

Figure 5:
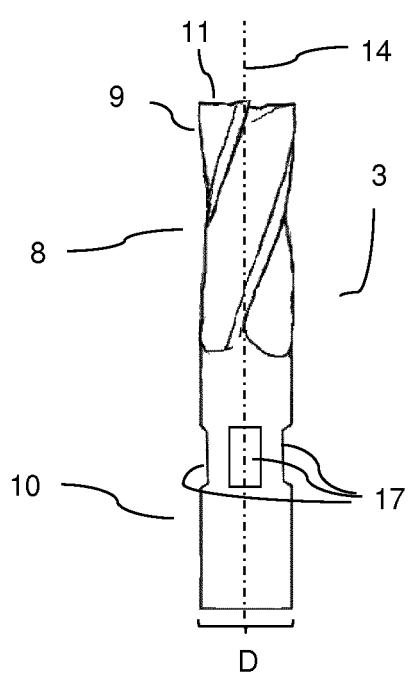
FIG. 5 shows a cutting tool for a cutting assembly.

FIG. 5 shows one of the cutting tools used in the cutting assembly shown in FIGS. 1-3. The same reference numbers as used in FIGS. 1-3 are used for corresponding features in FIG. 5. The cutting tool is a solid end mill made of cemented carbide. The shank comprises four interlocking features in the form of flat surfaces 17 (of which three is visible and indicated in the figure).

Figure 6:
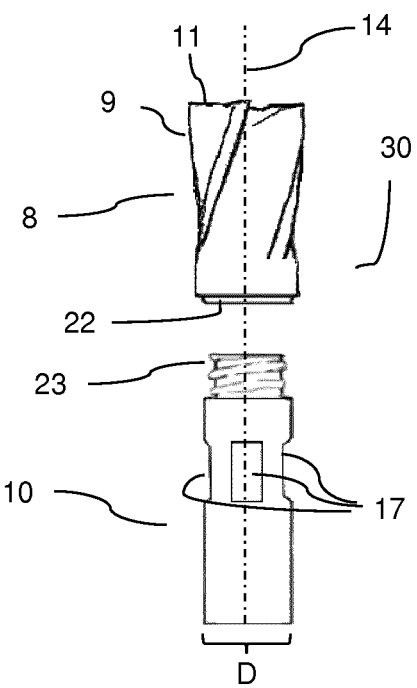
FIG. 6 shows another embodiment of a cutting tool for a cutting assembly.

An alternative embodiment of a cutting tool 30 for use in a cutting assembly according to the invention is shown in FIG. 6. The same reference numbers as used in FIGS. 1-3 are used for corresponding features in FIG. 6. The cutting tool 30, which comprises a shank 10 and a detachable cutting portion 8, is shown in an unassembled state in which the cutting portion 8 has an internal thread 22 (only partly seen in this view) and the shank has a part with an external thread 23 for mating with the internal thread of the cutting portion. When using the cutting tool in a cutting assembly, the cutting portion is connected to the shank using the threaded connection. Thereafter, the shank of the cutting tool is inserted into the tool holder.

Both tools described with reference to FIGS. 5 and 6 have a diameter D which is the same for both the shank 10 and the cutting portion 8. In other embodiments, the diameter of the cutting portion is greater than the diameter of the shank. Then the operational region of the cutting portion (corresponding to the peripheral cutting edge 9 in FIGS. 1-3) could be located at a greater radial distance from the tool holder central axis than all parts of the tool holder body, even if an opening 13 of the tool mounting recess is entirely located in the surface of the front end of the tool holder, and the central axis 20 of the tool mounting recess is parallel to the tool holder central axis 7.

The invention claimed is:

1. A cutting assembly comprising:
a tool holder including a tool holder body having a rear coupling end, a front end, a tool holder central axis around which the tool holder is rotatable, and at least a first and a second tool mounting recess, wherein the tool holder central axis extends through the tool holder body between the front end and the rear coupling end, and wherein each tool mounting recess includes an opening being at least partly located in a surface of the front end and spaced apart from the tool holder central axis; and
at least a first and a second cutting tool for milling, each cutting tool including a cutting tool body having a shank at a rear end, a cutting portion at a front end, which cutting portion including a plurality of peripheral cutting edges, and a cutting tool axis extending through the shank and the cutting portion, wherein the shank of the first cutting tool is arranged in the first tool mounting recess and the shank of the second cutting tool is arranged in the second tool mounting recess, such that at least a part of the cutting portion of each cutting tool extends from the tool holder, wherein an operational region of the cutting portion of each cutting tool is primarily facing outwards, in a radial direction, from the tool holder central axis, wherein each of the first and second tool mounting recesses includes a tool alignment arrangement including a screw and a threaded hole in the tool holder body, the threaded hole extending from the tool mounting recess to a peripheral surface of the tool holder body, and wherein each shank of the first and second cutting tools includes an interlocking feature associated with each respective peripheral cutting edge, the interlocking features being formed in the shank, each interlocking feature being arranged to interlock with a respective tool alignment arrangement such that each of the first and second cutting tools is non-rotatably arranged in a respective tool mounting recess with the corresponding peripheral cutting edge being in a predefined position with respect to the tool holder body, the tool holder body including a plurality of recessed parts extending along an outer surface of the tool holder body, and wherein each threaded hole opens into a respective recessed part of the tool holder body.

2. The cutting assembly according to claim 1, wherein the shank of each cutting tool includes an abutting end surface and each tool mounting recess includes a bottom support surface, wherein the abutting end surface of the first cutting tool abuts the bottom support surface of the first tool mounting recess, and the abutting end surface of the second cutting tool abuts the bottom support surface of the second tool mounting recess, such that the cutting tools are arranged at a predetermined axial position in relation to the tool holder body.

3. The cutting assembly according to claim 1, wherein each tool mounting recess has an elongated shape and extends at least partly into the tool holder body in a direction substantially parallel to the tool holder central axis, such that the cutting tool axis of each cutting tool is substantially parallel with the tool holder central axis.

4. The cutting assembly according to claim 1, wherein an axial distance A by which each cutting tool extends from the surface of the front end in the axial direction of the tool holder, is related to a diameter D of the cutting tool as $A \leq 1.5D$.

5. The cutting assembly according to claim 1, wherein the first and second cutting tools have a substantially equal extension from the surface of the front end in the axial direction of the tool holder.

6. The cutting assembly according to claim 1, comprising an even number of cutting tools being pairwise arranged such that the cutting tools of a pair are symmetrically arranged in the tool holder on opposite sides of, and equally spaced from, the tool holder central axis.

7. The cutting assembly according to claim 1, wherein the interlocking feature is a substantially flat region formed in the shank.

8. The cutting assembly according to claim 1, wherein the screw extends through the threaded hole and engages the interlocking feature of the shank.

9. The cutting assembly according to claim 8, wherein the threaded hole extends from the tool mounting recess to the peripheral surface of the tool holder body along a direction which is non-parallel to an imaginary straight radial line extending from the tool holder central axis through a central axis of the tool mounting recess.

10. The cutting assembly according to claim 1, wherein the shank of each cutting tool is solid.

* * * * *